United States Patent [19]

Bosen

[11] Patent Number: 4,495,572
[45] Date of Patent: Jan. 22, 1985

[54] COMPUTER INTERCOMMUNICATION SYSTEM

[75] Inventor: Robert J. Bosen, Spanish Fork, Utah

[73] Assignee: Zeda Computers International Limited, Provo, Utah

[21] Appl. No.: 346,856

[22] Filed: Feb. 8, 1982

[51] Int. Cl.³ ............................................. G06F 15/16
[52] U.S. Cl. ................................................... 364/200
[58] Field of Search ........................ 364/200 MS File

[56] References Cited

U.S. PATENT DOCUMENTS 4,388,683  6/1983  Beifuss et al. ...................... 364/200
4,396,978  8/1983  Hammer .............................. 364/200

Primary Examiner—Raulfe B. Zache
Attorney, Agent, or Firm—Mallinckrodt, Mallinckrodt, Russell & Osburn

[57] ABSTRACT

In a system of computers interconnected for communication between any two or more of the interconnected computers, such intercommunication being in packets of information in a standardized format normally at a standardized speed, a standardized location within the format is provided to contain information that may be used to change the intercommunication speed for the remainder of that particular packet.

10 Claims, 3 Drawing Figures

COMPUTER INTERCOMMUNICATION SYSTEM

BACKGROUND OF THE INVENTION

1. Field

The invention is in the field of computer communication systems, and particularly such systems known as local area networks in which a number of computers and peripheral equipment therefor are interconnected.

2. State of the Art

The computer industry has recently been working on systems of interconnected computers for which the name "local area networks" has been used. A local area network is a system of interconnected computers and peripheral equipment, such as printers, readers, etc., wherein each shares the resources of all of the others. The net result is a system whose power is greater than the sum of the individual parts, and whose cost per station is very low compared with other methods of achieving similar power. The dramatic decrease in per-station cost is the result of sharing expensive hardware, such as disk drives and printers, among many users, while the increase in power comes from coordination of multiprocessing and from multiple access to large, shared data bases.

Although such a system should result in reduced costs, this is not so if the system is designed for high speed transfer of data, since the interfacing components are expensive and can end up costing much more than the interconnected microcomputers and peripherals. One reason for this excessive cost is because the high speed transfer is faster than the computers themselves can assemble and send or receive information, so that, rather than being merely a simple, line connection, the interfacing equipment must either assemble the information to be sent from the computer and then implement the high speed transmission, or it must receive the high speed transmission and then break it down and feed it to the computer at a speed the computer can accept. Further, many of the components needed for certain of these high-speed communication systems are not yet commercially available. Thus, there is a need for a standardized, relatively low-speed communication system for use in local area networks in which the interfacing components merely transmit information that can be assembled in the computers themselves. Systems of this type have been suggested previously, utilizing a standard information packet format whereby data from any unit connected to the local area network can be transmitted to any other unit in such packet format, the communication being done at a standard speed.

Computers and peripheral equipment therefor do not all have the same speed capability. Some of the low-cost computers currently available, as well as some of the peripheral equipment, e.g. printers, operate relatively slowly compared to other currently available computers and peripheral equipment. Thus, while relatively low-speed is desired in order to reduce expense of the overall system, there is always the question of what low-speed should be regarded as standard. With present technology, speed of data exchange above 100 kHz is difficult to reach with low-cost components. Speeds above 1 MHz are difficult to reach even with exotic, expensive components. Further, line problems are encountered when speeds above 1 MHz are used which reduces the distance over which successful communication can be achieved. In addition, such high speeds require use of expensive line-driving equipment. Even at lower speeds, line problems may be encountered where distances are not sufficiently short. Thus speeds should be kept at a minimum, so that low-cost, large systems become possible. In all instances, speed should be no faster than the slowest computers or peripheral equipment that could be connected in the system. However, systems that operate too slowly for a given application are of no use. Certain applications, such as the transmission of pixel graphics from a computer or imaging system, require massive amounts of data interchange, and very large installations having dozens or hundreds of interconnected computers will quickly saturate a system with too low a speed. Accordingly, an ideal network speed must be achieved by compromise. In cost-sensitive applications, the network speed is kept as low as possible considering the job that must be done.

SUMMARY OF THE INVENTION

According to the invention, in a local area network system made up of various interconnected computers and devices peripheral to the computers and having a relatively slow, standardized communication speed, the communication taking place by means of standardized packets of information, information for changing the communication speed is provided at standardized locations within the packets respectively. Thus, the overall system can operate at a standard low-speed that is low enough to accommodate any equipment that might be connected to the network, yet, for communication between equipment that has higher speed capabilities, the speed can be increased and the amount of data in a packet can be increased.

In carrying out the invention, space is provided at the standardized location in the information packet for information to be used to increase the speed of transmission. In a preferred embodiment of the invention, a standardized information packet is provided having a preamble that contains necessary information, such as destination address, source address, and length of data field, and that also includes space for use by the communicating equipment to indicate increased speed of communication.

In the usual local area network, the computers and the peripheral equipment are connected together by a common bus, each through its own interface circuit. Each such interface circuit accepts signals from its associated computer or piece of peripheral equipment and places such signals on the bus, or accepts signals from the bus and feeds them to the associated computer or piece of peripheral equipment. The interface circuit is capable of operation at several selected speeds.

Each computer or piece of peripheral equipment is programmed to assemble information for transmission in standard information packet format and to read information transmitted to it in such standard packet format. Each is also programmed to cause its interface circuitry to operate at an increased speed in response to speed information contained in the packet. Thus, each piece of data transmitting equipment will cause its associated interface circuit to speed up after the information to increase speed has been transmitted, and each piece of receiving equipment will cause its associated interface circuit to speed up after the information to increase speed is received.

THE DRAWINGS

In the accompanying drawings, which represent the best mode presently contemplated for carrying out the invention:

FIG. 1 is a block diagram of a part of a local area network system in accordance with the invention;

FIG. 2, a diagramatic illustration of a standardized packet of information for use with the system of FIG. 1; and FIG. 3, a circuit diagram of an embodiment of interface circuit for use with the system of the invention.

DETAILED DESCRIPTION OF THE ILLUSTRATED EMBODIMENT

The invention is here described with respect to a presently preferred local area network computer system, wherein the computers and the peripherals are connected in a common-bus mode and utilize a collision system of communication.

A common-bus mode means that the computers and the pieces of peripheral equipment, such as printers, readers, etc., each forming an individual station, are all connected to one another in parallel through a common wire or bus. This provides a completely decentralized system wherein any two stations can communicate with each other directly without going through a centralized controller. With such connections, all stations continuously monitor the bus for packets of information addressed to them. Whenever any station wishes to transmit a packet to any other station, it verifies that the bus is silent and then quickly places the properly addressed packet on the bus. If the bus is already in use by some other station, additional stations desiring to transmit must wait for a silent time before placing their packet on the bus. The receiving station recognizes its own address within the packet and copies the data from the line into an internal memory. The entire procedure occupies only a few milliseconds, whereupon the network bus once again goes silent and becomes available to other potential transmitters.

Figure 1:
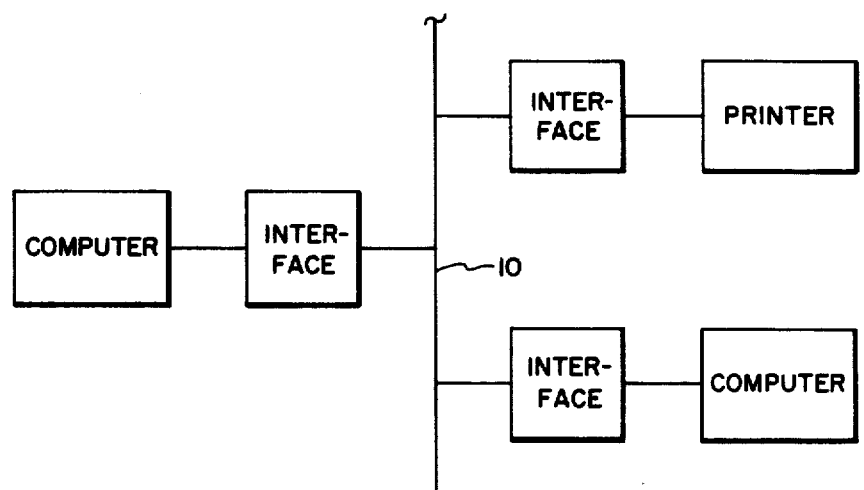

Such a common bus system is illustrated by the block diagram of FIG. 1, wherein two computers and a printer providing respective stations are connected through respective interface circuits to a common bus line 10. Any number of additional computers and peripheral equipment can be connected through similar interface circuits to bus line 10.

With a common bus system, it is possible for two stations to try to transmit at exactly the same time. This is called a collision, and each transmitting station detects collisions by listening to the bus a data is trnsmitted. If the received data is not the same as that transmitted, the station assumes that some other station has interfered and caused a collision. As soon as a station determines that it has had a collision, it stops transmitting and then waits a brief random time period before attempting to transmit again, defaulting to any station that has taken control of the bus in the interim. In this way, contentions are resolved in an orderly fashion without the need of a central controller.

A standard minimum speed must be chosen for the system and may vary in accordance with the considerations discussed hereinbefore under "State of the Art". In the preferred embodiment being considered herein, this standard minimum speed has been chosen to be a realtively slow 25,000 bits per second. This is slow enough so that practically all computers currently available can be connected to the system through the simple interface circuitry to be described later. The information packet format in the preferred embodiment is arbitrarily set up so that all packets begin with a preamble consisting of two break characters to mark the beginning of each packet, a three byte destination address, a three byte source address, a command byte, and a length byte which indicates the length of the data field. The data field makes up to rest of the packet except for a two byte check sum at the end of the packet. Time is then allowed so that the receiving station can acknowledge proper receipt of the packet.

Figure 2:
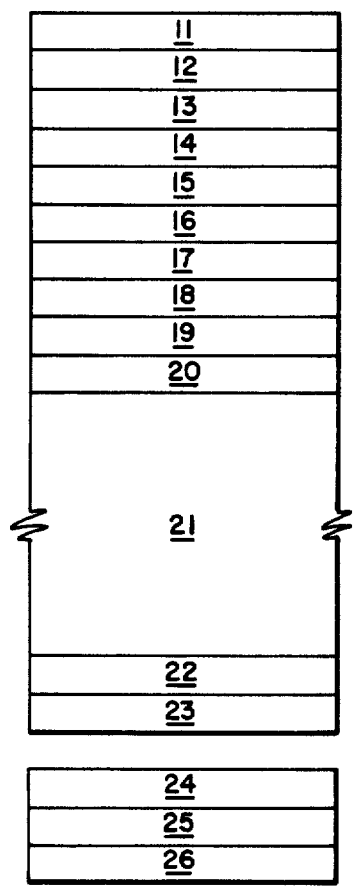

The packet is illustrated diagrammatically in FIG. 2. Each byte of the packet includes an initial start bit, eight information bits, and an ending stop bit, for a total of ten bits. A bit can be either high, i.e. a one, or low, i.e. a zero. A start bit is always a zero, and an end bit is always a one. This is currently standard format for asynchronous computer communications. The packet begins with a two byte break code indicated by bytes labeled 11 and 12. This break code consists of sixteen or more consecutive zero bits. This situation would never occur during normal data transmission, since each byte (ten bits) would contain at least a stop bit which is a one. Thus, during normal transmissions, there would be a least a one in each ten bits. If there are sixteen or more consecutive zeros, the start of a packet is indicated.

The third, fourth, and fifth bytes, 13, 14, and 15, respectively, are used to address the station to which the packet is to be sent. The sixth, seventh, and eighth bytes, 16, 17, and 18 respectively, provide the address of the station sending the information packet.

The ninth byte, 19, is set aside for special command signals between communicating stations and is the important feature of the present invention. This byte may be used by communicating stations to change communicating speed.

The tenth byte, 20, is used to indicate the length of the data field that follows. This allows the station to assign needed memory and also to know when data transmission has ended. The data field, 21, may vary in length depending upon the amount of data transmitted.

Immediately after the data field, two bytes 22 and 23 are provided for transmission of a check sum which is the sum of all bytes transmitted. The receiving station can then compare this number to the number of bytes it summed as received to ensure that it properly received all data.

The receiving station then has the option of, within just less than two character times (the time it would take to transmit two bytes at the standard speed), acknowledging receipt of the information packet if it so desires. Generally, such acknowledgement will take no more than three bytes, 24, 25 and 26. The packet is then completed, and the bus is open for further communication between stations.

The bus has to be free for at least two character times before additional packets may be sent.

Figure 3:
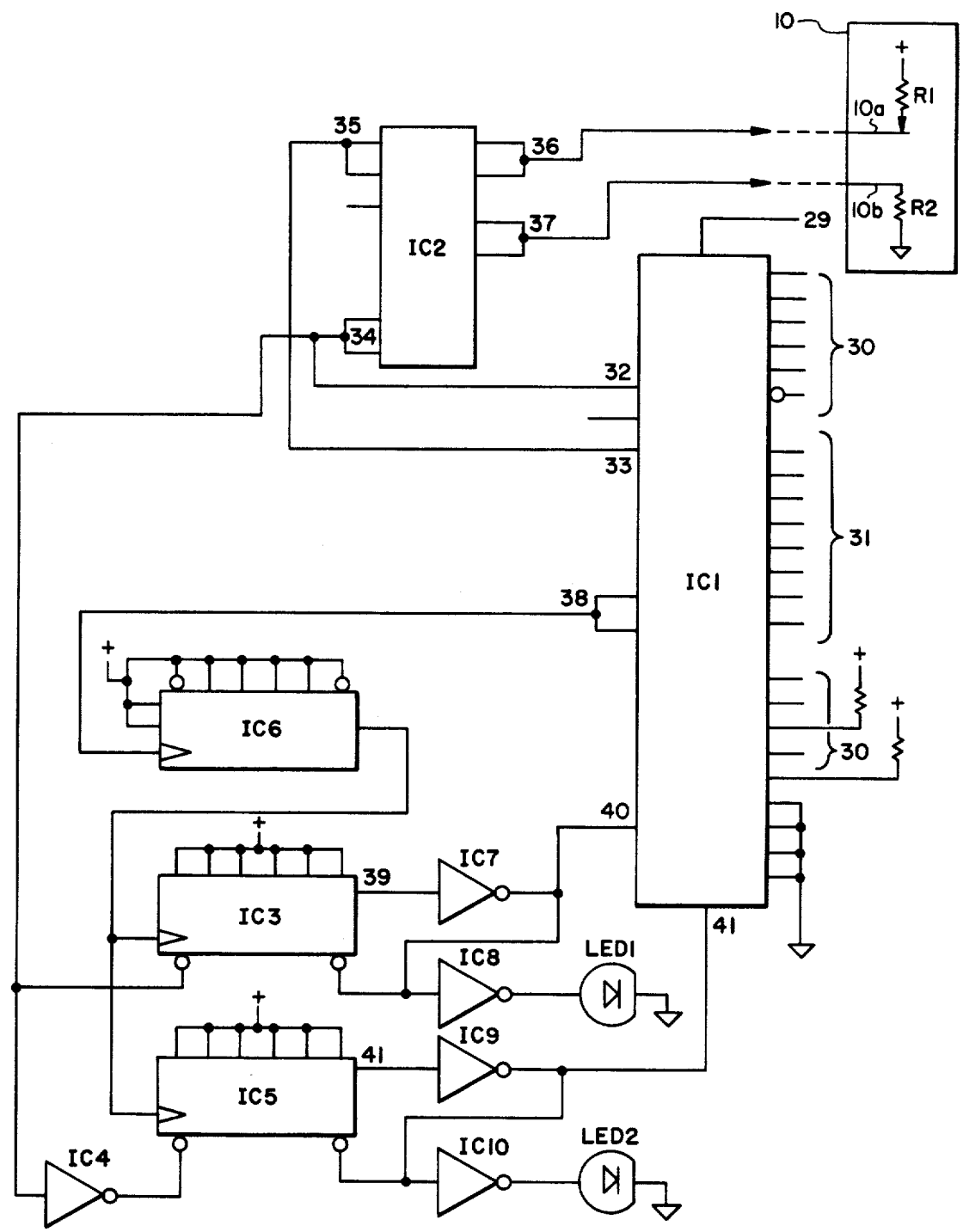

FIG. 3 illustrates an embodiment of the interface circuitry used between stations and the common bus. It constitutes the circuitry in each of the blocks labeled "Interface" in FIG. 1, and is simple and relatively inexpensive circuitry.

The computer or other equipment is connected directly to IC1, which may be a National Semiconductor 8250 integrated circuit commonly known as a UART that takes parallel information from the computer or other equipment and converts it to serial information for transmission, or that takes serial information from transmission and converts it to parallel information for the computer. The computer is connected to the terminals of IC1, indicated by reference numbers 29, 30 and 31. The terminal 29 represents a 2 MHz clock signal from the computer to IC1. This clock signal is divided intenerally in IC1 so that IC1 can operate at various speeds. The terminals 30 represent control connections between the computer and IC1 while the terminals 31 represent the data terminals at which the eight information bits of each byte are transferred from the equipment to IC1, or vice versa, in parallel.

Terminal 32 of IC1 represents the serial data input, and terminal 33 represents the serial data output. Terminals 32 and 33 are connected to terminals 34 and 35, respectively, of IC2, which may be a Texas Instruments 75118 line transceiver integrated circuit that converts the signals from IC1 to the level necessary for transmission on the bus 10, and that takes information from the bus 10 and converts it to the level required for IC1. The terminals 36 and 37 of IC2 are connected directly to bus 10. In the preferred embodiment illustrated, bus 10 is adapted to go high, i.e. to present a continuous "one" when the bus is not in use. Therefore, one conductor 10a of bus 10 is connected through a resistor R1 to the positive supply, while the other conductor 10b of bus 10 is connected through resistor R2 to ground. With no signal on bus 10, line 10a is high. The value of the resistors is such that, when transmitting data, line 10a is pulled low and line 10b is driven high for "zero" bits. Resistance values of 75 ohms have been found satisfactory.

The conditioned line data which is the output of IC2 at terminal 34 and which is sent to IC1, is also sent to IC3, that can be a Texas Instruments 74LS161 sixteen bit counter integrated circuit, and also through IC4, an inverter that can be a Texas Instruments 74LS04, to IC5, a sixteen bit counter similar to IC3.

Terminal 38 of IC1 outputs a clock signal that is sixteen times the bit rate at which IC1 is operating. This clock signal is connected to IC6, a sixteen bit counter similar to IC3 which operates to divide the signal by sixteen, so that the output of IC6 is a clock signal at the bit rate. The bit rate clock signal output of IC6 is connected to act as a clock for IC3 and IC5. IC3 will thus count the "one" bits that are received by IC2 and sent to IC1. As indicated, the bus 10 is designed to be high, i.e. to indicate "ones" when it is free. Thus, if at least sixteen consecutive "ones" are counted, this indicates that the line is free and a station wishing to transmit a packet of information may do so. Sixteen ones would never be a valid data transmission, because, during data transmission, the start signal for each byte is a zero. The sixteen ones are counted by IC3. The data signal enters IC3 through the clear terminal. As long as the signal on the data line remains high, the counter IC3 is not reset, so that it continues to count. When the count reaches sixteen, IC3 sends a signal from terminal 39 through inverter IC7 to terminal 40 of IC1 to indicate that the line is free. Such low signal is also connected back to the load terminal of IC3, which causes the signal at terminal 39 to remain high until the counter is reset by a change in the data line. Thus, the free signal remains until a packet is placed on the line. The low signal from IC7 is also inverted by IC8 and sent to light-emitting diode LED1. LED1 will light, giving a visual indication, whenever the bus is available.

As indicated earlier, the break signal indicating the start of transmission of an information packet consists of sixteen or more consecutive "zeros". IC5 counts the "zeros" similarly to IC3 counting the "ones". Thus, the "zeros" on the data line are inverted by IC4, and the output of IC4 is connected to the clear terminal of counter IC5. As long as the signal remains high, the counter continues to count and, when it reaches the count of sixteen, a high signal appears on terminal 41 of IC5, which is inverted by inverter IC9 and sent to terminal 41 of IC1, thereby indicating that an information packet is beginning and alerting the equipment attached to IC1 to look for its address to determine if the packet is directed to it. The output of IC9 is also connected back to the load terminal of IC5 to hold the high output of terminal 41 until the counter is reset. The signal from IC9 is also again inverted by IC10 and sent to LED2 to cause it to light to give a visual indication of when a break signal is received. The visual indications of the free and break signals are useful during trouble-shooting of the system or of an interface unit to indicate whether signals are being picked up from the line.

When a computer or other piece of equipment is connected to the bus, it has to be programmed sufficiently to be compatible with the system. This programing is such that the computer or other equipment will know its address and its own maximum speed of communication, and will be able to assemble and transmit information to the interface unit or to receive and disassemble information from the interface unit. This programing is straight forward and will be obvious to any person skilled in the art from the above description of the system and the explanation below. Also, the actual mechanics of the programming will vary for different types and models of computers or other equipment. Further, peripheral equipment may need some type of computer connected directly to it to perform in the system. Thus, a printer or other piece of equipment having no memory or reading capability of its own, may need a computer to receive and store information sent to it, to read such information, and to control the use of such information, as by controlling the actual operation of a printer. However, most such peripheral equipment has this capability built in.

With a system of the invention installed and the stations properly programmed, when a station needs to communicate with another station, if it does not already know the maximum receiving speed of such a station, the station will send an information packet to the other station to ask the other station its maximum speed for receiving data. The other station will respond, either in an acknowledgement or in a separate packet addressed to the requesting station, indicating its maximum speed. The first station will store such information for future use. It will then prepare the packet of information to be sent to the other station, and knowing its own maximum speed capability for transmitting data and the receiving station's maximum speed for receiving data, will determine what speed should be used. In order to maximize the amount of data transfer, such speed will probably be the maximum speed of the slowest station.

Thus, the information packet is transmitted, first, at the standard, relatively low speed through the command byte. The command byte may then tell the receiving station that the remainder of the packet will be transmitted at the higher, selected rate of speed. A slight delay may be provided between the command byte and the following bytes (between bytes 19 and 20 in FIG. 2) to give the stations time to adjust the transmission and receiving speed of IC1 in the respective interface stations, but such delay would be less than sixteen standard bit times. Transmission of the remainder of the packet is done at the increased speed.

After transmission of that packet, the start of any other packet is again made at the standard, relatively slow speed, with increase, if desired by the communicating station coming after the command byte. In this way, the system's standard speed can be chosen to accommodate the lowest speed equipment that might be used with such system, but still maximize data transfer in the system by utilizing a faster communication rate between equipment capable of faster communication rates. Also, in this way, where a packet length may be limited, such as in the preferred system where total packet length is limited to 250 msec., more data can be transmitted in a single packet at a higher speed.

In addition to the communication rate capability of communicating equipment, other factors, such as the distance between the pieces of communicating equipment, may be taken into account in determining communication speed. Thus, two high speed units located closely together could communicate at their highest speeds, but, if separated some longer distance apart along the bus, would communicate more slowly because of line effects on high speed communication.

With the present invention, there is no necessity to provide expensive interface units for the slower machines to increase their communication speed to that of a standard high speed in a high-speed system. The system of the invention is very flexible and can accept a wide variety of equipment of various speeds, with only the inexpensive interface unit described being necessary for connection of the unit to the bus and with the programming of the unit as described to enable it to operate in the system.

Although the invention has been described with respect to a specific information packet format, it should be realized that any type of information packet format may be used. The important feature of the invention is in the provision of means whereby communicating equipment can increase the speed of communication between themselves when and if desired.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A computer intercommunication system, comprising an intercommunication bus; a plurality of computers; an equal plurality of interface means, each interface means being associated with and electrically connected to a respective one of said computers and to said bus to accept signals from the said one computer and to place such signals on said bus, or to accept signals from said bus and to feed them to the said one computer, said interface means being normally operable at a standarized speed but capable of operating at other speeds; program means within each computer for enabling that computer to assemble information to be communicated into a standardized information packet, such packet containig a place to introduce information that can be used by computers in intercommunication therewith by way of said bus to increase the speed of communication for the other information in the packet and to cause the sending computer to increase the speed of transmission of the packet after transmission of the speed information if the latter indicates increased speed, and to cause the receiving computer to increase the speed of receiving the other information in the packet after receiving the speed information, if the latter indicates increased speed.

2. A system according to claim 1, wherein computer peripheral equipment is included in the system and independently connected with the bus by its own interface means.

3. A system according to claim 2, wherein the standardized information packet contains address information addressing an individual packet to one or more of the interconnected computers or peripheral equipment prior to the speed change information.

4. A system according to claim 3, wherein the communication bus is connected to the computers and to any peripheral equipment in common.

5. A system according to claim 4, wherein each interface means includes a standard UART circuit.

6. A system according to claim 5, wherein the common bus is adapted to give a continuous high indication when not in use, and the interface means includes means to detect such high signal and to provide an indication of bus availability after detecting a continuous high level on the bus line for a predetermined time period.

7. A system according to claim 6, wherein each information packet begins with at least a predetermined number of continuous low signals, and the interface means includes means to detect such low signals and to provide an indication of start of an information packet after the predetermined minimum number of continuous low level signals on the line.

8. A system according to claim 7, wherein the means for detecting the high signal and the means for detecting the low signals are counters.

9. In a system of computers containing information and interconnected for communication between any two or more of said computers at a standardized speed by means of a standardized information packet, means for providing as part of any information packet to be communicated from one computer to another, information regarding speed of intercommunication of the remainder of that communication; and means responsive to the speed information for changing the intercommunication speed when a change is indicated.

10. A method of increasing the amount of data and number of communications that can be transmitted over a communication system of interconnected computers which normally operates at a standardized speed, comprising the steps of establishing a format of intercommunication between any two or more of the interconnected computers; providing a location in that format which may be used for the inclusion of information to increase the speed of intercommunication for the remainder of that communication; programing the computer connected to such system to assemble or read information in such format; and increasing the speed of intercommunication for the remainder of a communication in response to the speed increase information.

* * * * *